United States Patent
Devenyi et al.

(10) Patent No.: US 6,777,666 B1
(45) Date of Patent: Aug. 17, 2004

(54) POSITION SENSOR UTILIZING LIGHT EMISSIONS FROM A LATERAL SURFACE OF A LIGHT-EMITTING STRUCTURE AND TWO LIGHT COLLECTORS

(75) Inventors: Gabor Devenyi, Penetang (CA); Kevin B. Wagner, Victoria Harbour (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/290,551

(22) Filed: Nov. 7, 2002

Related U.S. Application Data

(63) Continuation-in-part of application No. 10/222,468, filed on Aug. 16, 2002.

(51) Int. Cl.⁷ .............................................. H01J 40/14
(52) U.S. Cl. ................................ 250/214 PR; 250/229; 356/614
(58) Field of Search ....................... 250/227.11, 227.31, 250/231.1, 231.13, 214 PR, 229; 356/614–616, 621

(56) References Cited

U.S. PATENT DOCUMENTS 5,376,785 A * 12/1994 Chin et al. ............ 250/214 PR

* cited by examiner

*Primary Examiner*—David Porta
*Assistant Examiner*—Patrick J. Lee
(74) *Attorney, Agent, or Firm*—William C. Schubert; Edward S. Roman

(57) ABSTRACT

A position sensor includes a light-source-and-light-emitting structure that emits light from each of an emitter plurality of light emitters. Light from the light emitters is received by light collectors in the lateral surfaces of two light collecting optical fibers or other light-collector structures, each in a parallel but spaced-apart relation to the light-source-and-light-emitting structure and axially spaced apart from each other. The light emitting structure and the light collectors are preferably optical fibers. An opaque light shield lies between and moves parallel relative to the light-source-and-light-emitting structure and the light collectors. A sensor readout receives the light outputs from each of the light collectors, and provides a responsive sensor output indicative of the position of the light shield.

16 Claims, 4 Drawing Sheets

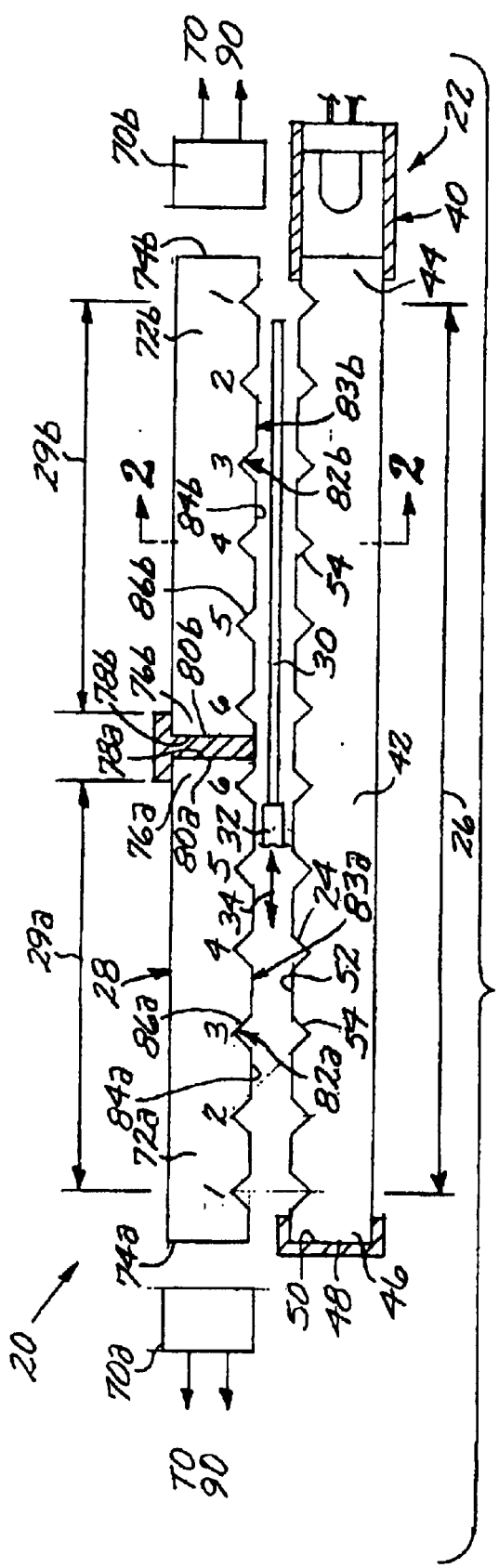
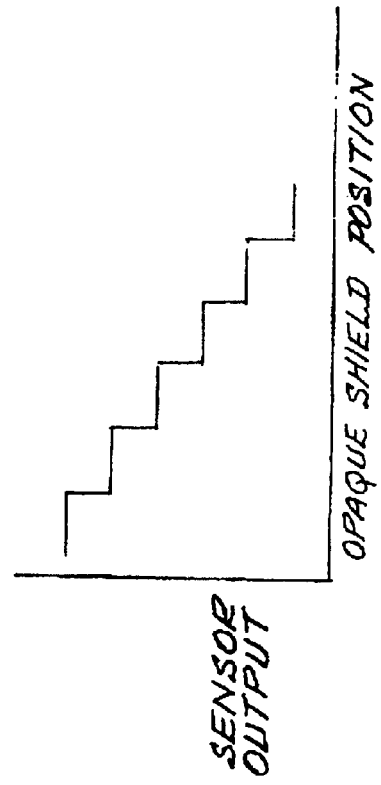
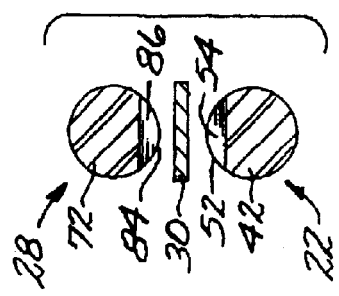
FIG. 1
FIG. 2
FIG. 3

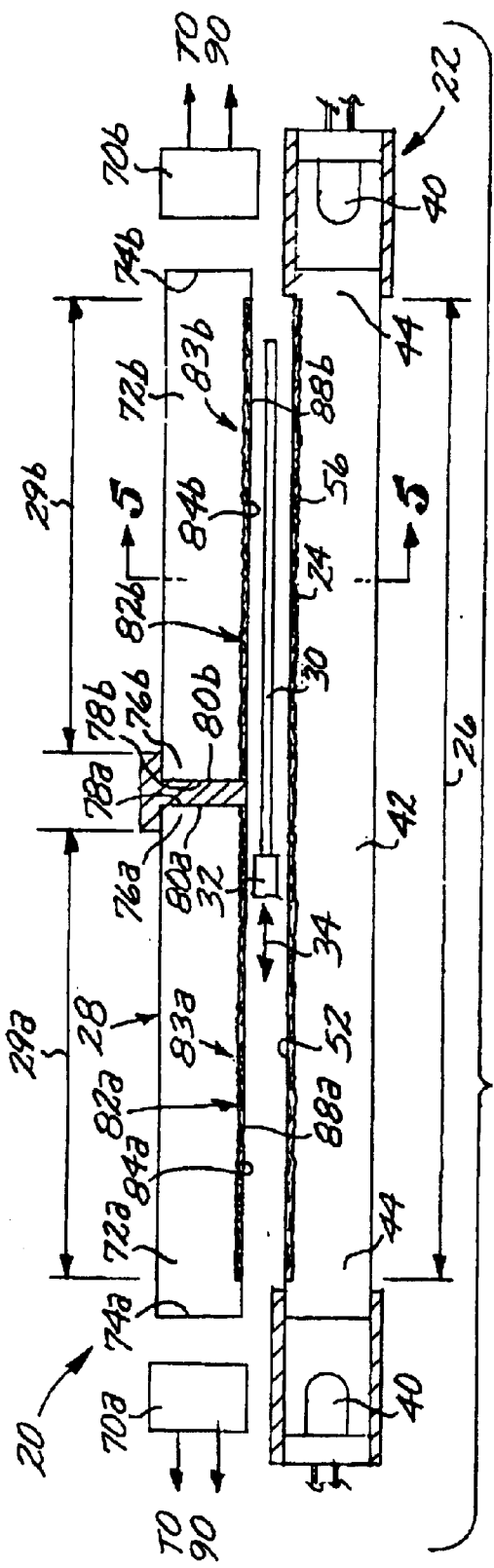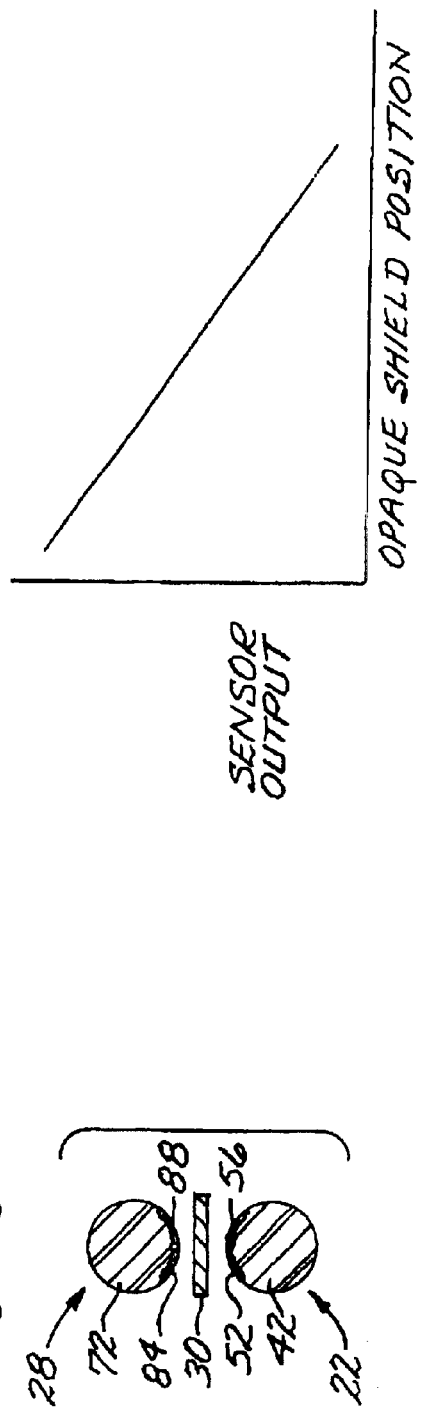

POSITION SENSOR UTILIZING LIGHT EMISSIONS FROM A LATERAL SURFACE OF A LIGHT-EMITTING STRUCTURE AND TWO LIGHT COLLECTORS

This application is a continuation-in-part of application Ser. No. 10/222,468, filed Aug. 16, 2002, for which priority is claimed and whose disclosure is incorporated by reference.

This invention relates to the measurement of the relative physical position of two articles and, more particularly, to an optical-fiber position sensor.

BACKGROUND OF THE INVENTION

There are many mechanical, electrical, and optical techniques for measuring the relative position of two articles. For example, a mechanical arm may be lengthened or shortened responsive to the movement of the articles. A change in an electrical property such as resistance or capacitance with relative position may be measured. Optical techniques such as light interference measurements or light attenuation in an attenuating medium are used when appropriate.

The available measurement techniques all have drawbacks in various applications. Mechanical measurement techniques impose loads on the system being measured, add substantial weight, are difficult to miniaturize, are difficult to provide with redundancy, and are subject to premature failures. Electrical measurement techniques are often limited to small changes in position, and are therefore not useful when the changes are on the order of many inches, feet, or more. They often require an exposed electrical contact, and usually at least a portion of the electrical measurement apparatus must move with the moving article so that the lead wires must also move. Electrical measurements also suffer from a high sensitivity to the environment of the sensor and to alignment errors. Optical position-measurement techniques typically require a line of sight between the articles, and are extremely sensitive to misalignment.

There is a need for an improved technique for measuring the relative position of two articles which overcomes these drawbacks. The present invention fulfills this need, and further provides related advantages.

SUMMARY OF THE INVENTION

The present invention provides a position sensor of the relative position between two objects that is based on the use of optical fiber technology. The position sensor is of low cost and high reliability, is highly sensitive to changes in position, and is easy to miniaturize. In some embodiments, there are no moving optical components, so no mechanical, electrical, or optical linkages to the moving article are required. The approach is insensitive to misalignment within normal tolerances. There is no additional mechanical loading to the moving article resulting from the position sensor, and no frictional forces that must be overcome.

In accordance with the invention, a position sensor comprises a light-source-and-light-emitting structure operable to emit light from each of an emitter plurality of light emitters disposed along an emitting length. The light-source-and-light-emitting structure typically comprises a light source such as a light-emitting diode. In a preferred form, the light-source-and-light-emitting structure comprises a light source, and a light-emitting optical fiber having an insertion end that receives a light input from the light source, and an emitter plurality of light emitters disposed along an emitting length of a lateral surface of the light-emitting optical fiber. The light emitters may be of any operable form, such as emitting notches in the light-emitting optical fiber or roughened emitting surfaces on the light-emitting optical fiber.

There is a first light detector having a first-light-detector light output, and a first light-collecting structure in a parallel-but-spaced-apart relation to the emitting length of the light-source-and-light-emitting structure. The first light-collecting structure has a first-light-collecting-structure extraction end that provides a first light output to the first light detector, and a first plurality of first-light-collecting-structure light collectors disposed along a first-light-collecting-structure collecting length of the first light-collecting structure in a facing relation to a first group of the respective light emitters of the light-source-and-light-emitting structure. There is, additionally, a second light detector having a second-light-detector light output, and a second light-collecting structure in a parallel-but-spaced-apart relation to the emitting length of the light-source-and-light-emitting structure. The second light-collecting structure has a second-light-collecting-structure extraction end that provides a second light output to the second light detector, and a second plurality of second-light-collecting-structure light collectors disposed along a second-light-collecting-structure collecting length of the second-light-collecting structure in a facing relation to a second group of the respective light emitters of the light-emitting structure. The first group and the second group of light emitters of the light-emitting structure are different. An opaque light shield is disposed between and movable parallel relative to the light-source-and-light-emitting structure and the light-collecting structures. A length of the opaque light shield measured parallel to the light-source-and-light-emitting structure is such that at least some of the first group and at least some of the second group of light collectors are not facing the light shield for at least some positions of the light shield.

There is desirably a sensor readout that receives the first-light-detector light output and the second-light-detector light output, and provides a responsive sensor output indicative of the position of the light shield. In one embodiment, the sensor output is responsive to a difference between the first-light-detector light output and the second-light-detector light output.

Preferably at least one of the first light-collecting structure and the second light-collecting structure comprises an optical fiber. The light collectors may be, for example, collecting notches in the light-collecting optical fibers or roughened collecting surfaces on the light-collecting optical fibers. There may be a second end remote from the extraction end of the light-collecting optical fibers, wherein the second end of the light-collecting optical fiber is internally reflective. In one preferred form, the first light-collecting optical fiber and the second light-collecting optical fiber are substantially coaxial.

The position sensor of the invention has a low manufacturing cost and is of high reliability. It may be readily scaled for emitting and collecting lengths, and may be made as large or as small as necessary. The only longitudinally extending components of the position sensor are the two optical fibers, which may each be less than 0.010 inch in diameter, and may be made smaller (or larger) if desired. These components may therefore be positioned in a small space on either side of the opaque shield. The two optical fibers may instead be larger diameter optical rods. The position sensor may be made with no moving optical components, by affixing the light shield to the moving element. Equivalently in an operating sense, the optical components may be affixed to the moving element. The present approach is relatively insensitive to maintaining a precise alignment between the optical fibers.

The position sensor is an optical device that achieves many of the same results as an electromechanical potentiometer that has a resistive element and a sensing element, but without its disadvantages. In the present approach, the sensing is achieved in a noncontacting manner by varying the amount of light transmitted to the light-collecting optical fiber rather than in a contacting manner as in an electromechanical potentiometer. The contacting elements of the electro-mechanical potentiometer can wear, resulting in degradation of performance as well as cross contamination of the contacting elements. The frictional forces of the contacting elements may also adversely affect its performance. The present approach has none of these disadvantages.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic elevational view of a first embodiment of the position sensor;

FIG. 2 is a sectional view of the position sensor of FIG. 1, taken along line 2—2;

FIG. 3 is a graph of output of the light detector as a function of position of the opaque light shield, for the first embodiment of FIG. 1;

FIG. 4 is a schematic elevational view of a second embodiment of the position sensor;

FIG. 5 is a sectional view of the position sensor of FIG. 4, taken along line 5—5;

FIG. 6 is a graph of output of the light detector as a function of position of the opaque light shield, for the second embodiment of FIG. 4;

DETAILED DESCRIPTION OF THE INVENTION

Figure 7:
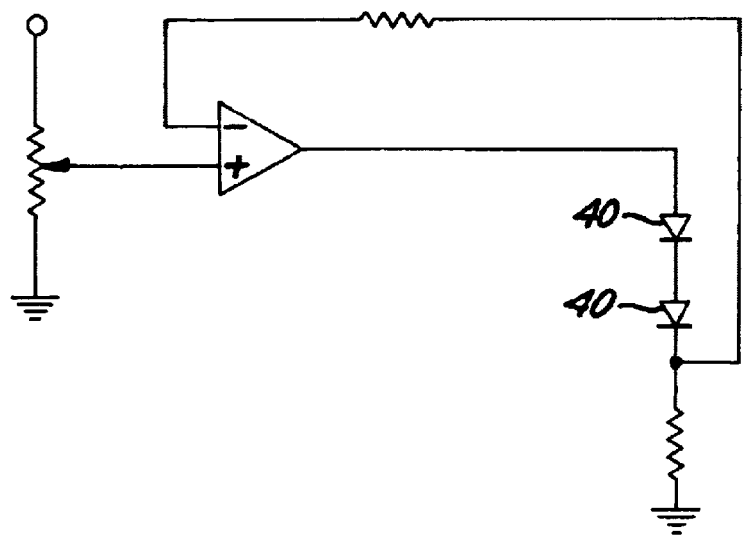
FIG. 7 is a schematic circuit diagram of a regulated power supply for the light source.

FIGS. 1–2 and 4–5 depict embodiments of a position sensor 20. In each embodiment, the position sensor 20 includes a light-source-and-light-emitting structure 22 operable to emit light from each of a plurality of light emitters 24 disposed along an emitting length 26. The position sensor 20 further includes a light-collecting-and-detecting structure 28 operable to receive light along two (as illustrated) or more collecting lengths 29a and 29b from each of the plurality of light emitters 24 of the light-source-and-light-emitting structure 22. An opaque light shield 30 is disposed between and movable parallel relative to the light-source-and-light-emitting structure 22 and the light-collecting-and-detecting structure 28. As the opaque light shield 30 is moved to expose more of the light emitters 24, the light output of the light-collecting-and-detecting structure 28 changes, resulting in a readout of the position of the opaque light shield 30 relative to the position of the light-source-and-light-emitting structure 22 and the light-collecting-and-detecting structure 28. In one form, the light-source-and-light-emitting structure 22 and the light-collecting-and-detecting structure 28 are stationary, and the opaque light shield 30 is affixed to a movable element 32 that is movable in a movement direction 34. This form is preferred, as no electrical or light connections need extend to the movable element 32. Equivalently from a functional standpoint, the light-source-and-light-emitting structure 22 and the light-collecting-and-detecting structure 28 may be affixed to the movable element, and the opaque light shield 30 may be stationary.

The light-source-and-light-emitting structure 22 includes a light source 40 such as a light-emitting diode or a lamp, and a light-emitting optical fiber 42. The light-emitting optical fiber 42 has an insertion end 44 that receives a light input from the light source 40. In the embodiment of FIGS. 1–2, the light-emitting optical fiber 42 further includes a second end 46 remote from the insertion end 44, wherein the second end 46 of the light-emitting optical fiber 42 has an end cap 48 and is internally reflective due to a reflective coating 50 applied to the second end 46. In the embodiment of FIGS. 4–5, both ends of the light-emitting optical fiber 42 are insertion ends 44, and there is separate light source 40 at each end of the light-emitting optical fiber 42. It is preferred that the light source(s) 40 be driven with a constant current, and FIG. 7 illustrates an example of such a constant-current drive.

The light-emitting optical fiber 42 includes the plurality of light emitters 24 disposed along the emitting length 26 of a lateral surface 52 of the light-emitting optical fiber 42. The lateral surface 52 is the side surface of the light-emitting optical fiber 42 between its ends 44 and 46 (FIG. 1), or 44 and 44 (FIG. 4). The light emitters 24 may be of any operable form, and two forms are of particular interest. In the embodiment of FIGS. 1–3, the light emitters 24 are notches 54 through the cladding of the light-emitting optical fiber 42, positioned to face the light-collecting-and-detecting structure 28. In the embodiment of FIGS. 4–6, the light emitters 24 are roughened regions 56 of the lateral surface 52 of the light-emitting optical fiber 42, positioned to face the light-collecting-and-detecting structure 28. An optical fiber generally transmits light therethrough by total internal reflection and without substantial loss of light energy through the lateral surface. However, intentionally introduced imperfections such as the light emitters 24 interrupt the total internal reflection and cause light to be lost through the lateral surface 52 at the location of the imperfections, thereby serving as lateral-surface light emitters 24.

The light-collecting-and detecting structure 28 is formed of two (as illustrated) or more light detectors 70a and 70b such as photocells or photodiodes, and a corresponding number of light-collecting optical fibers 72a and 72b in a parallel but spaced-apart relation to the light-emitting optical fiber 42. The two light-collecting optical fibers 72a and 72b are preferably arranged in a substantially coaxial fashion to each other and substantially parallel to, but laterally separated from, the movement direction 34 of the light shield 30. The functionality of the position sensor 20 is tolerant of misalignments of the optical fibers 42, on the one hand, and 72a and 72b, on the other hand, so that they need not be perfectly parallel. The structures of the light-collecting optical fibers 72a and 72b, and the related elements, are similar but arranged in a back-to-back fashion in the preferred embodiments. Accordingly, they will be discussed in a related fashion, using suffixes "a" and "b" to refer to the corresponding elements of structure. In each case, references are made in a respective fashion to the elements with the same suffix.

The light-collecting optical fibers 72a and 72b each have an extraction end 74a and 74b that provides a light output to the respective light detectors 70a and 70b. Desirably, the light-collecting optical fibers 72a and 72b each further includes a respective second end 76a and 76b remote from the respective extraction ends 74a and 74b. The second ends 76a and 76b of the light-collecting optical fibers 72a and 72b each have an end cap 78a and 78b (that may be combined into a single structure as illustrated because of the back-to-back relation of the light-collecting optical fibers 72a and 72b) and is internally reflective due to a reflective coating 80a and 80b applied to the respective second ends 76a and 76b.

The light-collecting optical fibers 72a and 72b each includes a plurality of light collectors 82a and 82b disposed along the collecting length 29 of a respective lateral surface 84a and 84b of the respective light-collecting optical fiber 72a and 72b. Each lateral surface 84a and 84b is the side surface of the light-collecting respective optical fiber 72a and 72b between its ends 74a, 76a and 74b, 76b. The light collectors 82a and 82b may be of any operable form, and two forms are of particular interest. The light collectors 82a serve as a first group 83a of light collectors, and the light collectors 82b serves as a second group 83b of light collectors. In the embodiment of FIGS. 1–3, the light collectors 82a and 82b are notches 86a and 86b through the cladding of the respective light-collecting optical fiber 72a and 72b, positioned to face the respective notches 54 of the light-emitting optical fiber 42. In the embodiment of FIGS. 4–6, the light collectors 82a and 82b are roughened regions 88a and 88b of the lateral surfaces 84a and 84b of the light-collecting optical fibers 72a and 72b, positioned to face the corresponding roughened regions 56 of the light-emitting optical fiber 42. The light collectors 82a and 82b function in a comparable but inverse manner to the light emitters 24, receiving light energy that is then transmitted along the length of the respective light-collecting optical fibers 72a and 72b to the respective light detectors 70a and 70b. The light emitters 24 and the light collectors 82a and 82b may be of the same type (e.g., both notches or both roughened regions), as illustrated, or of different types in any one embodiment (e.g., notched light emitter and roughened light collector, or roughened light emitter and notched light collector). Additionally, some of the light emitters 24 may be notches and some may be roughened regions, and some of the light collectors 82a and 82b may be notches and some may be roughened regions.

Where the light emitters 24 and/or the light collectors 82a and 82b are roughened regions (embodiment of FIGS. 4–6), the roughened regions desirably extend only a small fraction of the distance around the circumference of the respective optical fiber, as for example no more than about 5–10 percent of the portion of the circumference that is facing the opposing optical fiber. If a greater fraction is roughened, there is an undesirably high light attenuation. The roughened region may be a continuous length along the respective optical fiber, resulting in a continuous emission or collection of light along the length, or it may be a series of short segments resulting in a discontinuous emission or collection of light along the length. As used herein, "roughened regions" are regions having imperfections that are relatively small as compared with the diameter of the optical fiber, to interrupt the total internal reflection of the optical fiber. Roughening may be accomplished by any operable approach that interrupts the total internal reflection, such as scratching, abrading, grit blasting, and the like.

Figure 9:
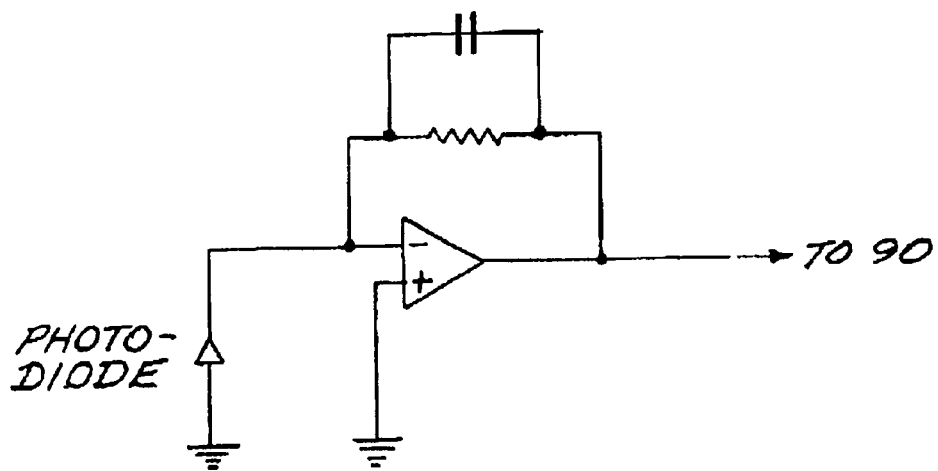
FIGS. 9 and 10 are schematic circuit diagrams of light-detector interfaces for a photo diode and a resistive sensor, respectively.
Figure 10:
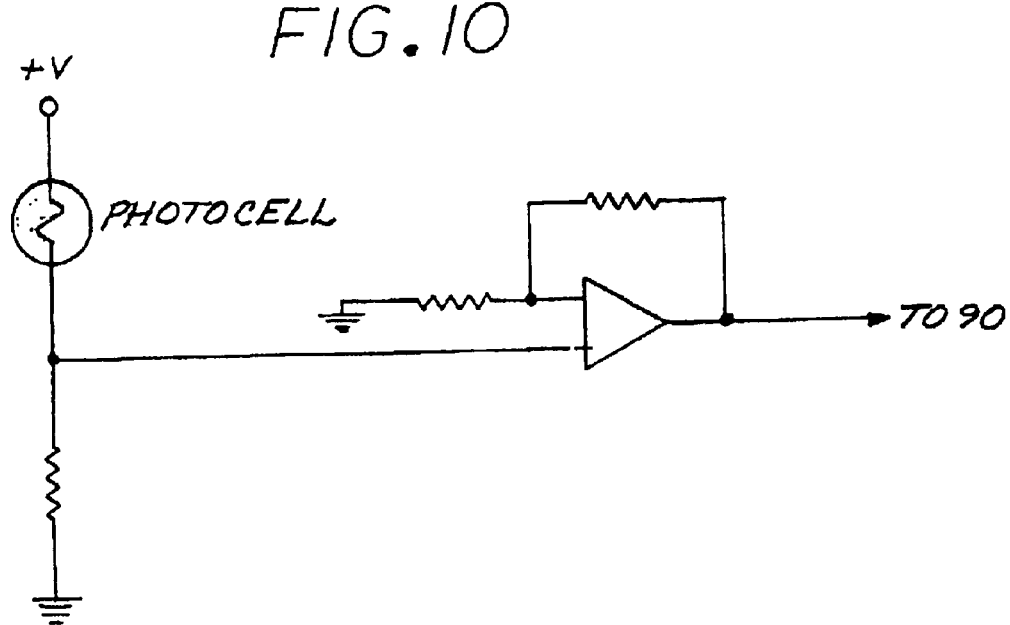

A length of the opaque light shield 30 measured parallel to the light-source-and-light-emitting structure 22 and to the movement direction 34 is such that at least some of the first group 83a of light collectors 82a and at least some of the second group 83b of light collectors 82b are not facing the light shield 30 for at least some positions of the light shield 30. The output of the light detectors 70a and 70b are electrically processed by a sensor readout 90, shown in FIG. 8, to produce a sensor output 92 that is responsive to and indicative of the position of the opaque light shield 30. (Detector interfaces may be placed between the signal outputs of the light detectors 70a and 70b, and the signal inputs of the sensor readout 90. FIGS. 9–10 illustrate examples of detector interfaces for a photo diode and a photocell, respectively.)

Figure 8:
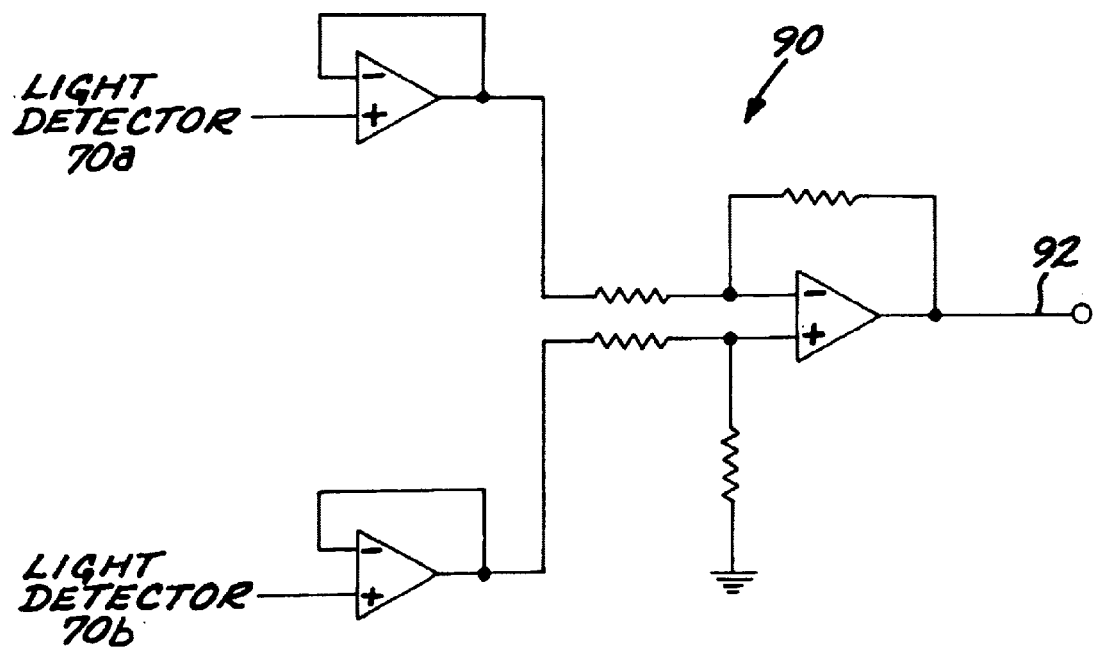
FIG. 8 is a schematic circuit diagram of a circuit having an output proportional to the difference between the light outputs of the two light detectors.

Desirably, and as shown in a preferred sensor readout 90 of FIG. 8, the sensor output 92 is responsive to an arithmetic difference in the light outputs of the light detectors 70a and 70b. With this sensor readout 90, when the output of light detectors 70a and 70b are the same, there is a null sensor output 92. When the output of light detector 70a is greater than that of light detector 70b, there is a negative voltage as the sensor output 92. When the output of light detector 70a is less than that of light detector 70b, there is a positive voltage as the sensor output 92. The sensor output 92 responsive to the light outputs of the light detectors 70a and 70b is illustrated schematically in FIGS. 3 and 6 for the respective embodiments of FIGS. 1–3 and 4–6.

Having a sensor output 92 that is responsive to the difference in the light outputs of the light detectors 70a and 70b results in a non-contacting, optical position sensor 20 that behaves in a manner similar to that of an electro-mechanical potentiometer, without its disadvantages.

The sensor output of the embodiment of FIGS. 1–3, illustrated in FIG. 3, which utilizes notched light collectors 82a and 82b, is a step-function of the position of the opaque light shield 30. That is, when the opaque light shield 30 is in its rightmost position in FIG. 1 so that it blocks all of the light collectors 82b and none of the light collectors 82a, there is no light output. As the opaque light shield 30 is moved generally parallel to, and to the left relative to the light-source-and-light-emitting structure 22 and the light-collecting-and-detecting structure 28 in FIG. 1, the light collectors 82b are progressively uncovered and the light collectors 82a are progressive covered, so that more light propagates through the light collectors 82b from the light-emitting optical fiber 42 and less light propagates through the light collectors 82a from the light-emitting optical fiber 42, and thence to their respective light detectors 70a and 70b. In this case the light output is a step function due to the discrete nature of the notches 54a and 54b. In the illustrated embodiment six pairs notches 54a and 54b are illustrated, and the corresponding six steps in FIG. 3 are depicted. The width of the steps may be varied by making the notches 54a, 54b closer together or farther apart, and the height of the steps may be varied by increasing the number of the notches. This stepped light output is useful, for example, in applications where the objective is to position the movable element 32 at any of a series of discrete stepped locations.

The light output of the embodiment of FIGS. 4–6, illustrated in FIG. 6 and which utilizes the roughened regions 88a and 88b that are continuous along the length of the light-collecting optical fiber 72 and the roughened region 56 that is continuous along the length of the light-emitting optical fiber 42, varies continuously as a function of the position of the opaque light shield 30. This embodiment otherwise functions in the same manner as described for the embodiment of FIGS. 1–3, which discussion is incorporated here.

Although the steps of FIG. 3 are illustrated as regular and the slope of the line in FIG. 6 is illustrated to be straight, there may be some variation from these ideal relations. That variation does not pose a problem as long as it is repeatable, because the relations of FIGS. 3 and 6 may be calibrated and stored in a look-up table.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A position sensor comprising
   a light-source-and-light-emitting structure operable to emit light from each of an emitter plurality of light emitters disposed along an emitting length;
   a first light detector having a first-light-detector light output;
   a first light-collecting optical fiber in a parallel but spaced-apart relation to the emitting length of the light-source-and-light-emitting structure and having
      a first-light-collecting-optical-fiber extraction end that provides a first light output to the first light detector, and
      a first plurality of first-light-collecting-optical-fiber light collectors disposed along a first-light-collecting-optical-fiber collecting length of a first-light-collecting-optical-fiber lateral surface of the first light-collecting optical fiber in a facing relation to a first group of the respective light emitters of the light-source-and-light-emitting structure;
   a second light detector having a second-light-detector light output;
   a second light-collecting optical fiber in a parallel but spaced-apart relation to the emitting length of the light-source-and-light-emitting structure and having
      a second-light-collecting-optical-fiber extraction end that provides a second light output to the second light detector, and
      a second plurality of second-light-collecting-optical-fiber light collectors disposed along a second-light-collecting-optical-fiber collecting length of a second-light-collecting-optical-fiber lateral surface of the second light-collecting optical fiber in a facing relation to a second group of the respective light emitters of the light-source-and-light-emitting structure, wherein the first group and the second group of light emitters of the light-source-and-light-emitting structure are different; and
   an opaque light shield disposed between and movable relative to the light-source-and-light-emitting structure and the light-collecting optical fibers, wherein a length of the opaque light shield measured parallel to the light-source-and-light-emitting structure is such that at least some of the first group and at least some of the second group of light collectors are not facing the light shield for at least some positions of the light shield.

2. The position sensor of claim 1, further including
   a sensor readout that receives the first-light-detector light output and the second-light-detector light output, and provides a responsive sensor output indicative of the position of the light shield.

3. The position sensor of claim 2, wherein the sensor output is responsive to a difference between the first-light-detector light output and the second-light-detector light output.

4. The position sensor of claim 1, wherein the light-source-and-light-emitting structure comprises a light source.

5. The position sensor of claim 4, wherein the light source is a light-emitting diode.

6. The position sensor of claim 1, wherein the light-source-and-light-emitting structure comprises:
   a light source, and
   a light-emitting optical fiber having
      an insertion end that receives a light input from the light source, and
      the emitter plurality of light emitters disposed along the emitting length of a lateral surface of the light-emitting optical fiber.

7. The position sensor of claim 6, wherein at least some of the light emitters are emitting notches in the light-emitting optical fiber.

8. The position sensor of claim 6, wherein at least some of the light emitters are roughened emitting surfaces on the light-emitting optical fiber.

9. The position sensor of claim 1, wherein at some of the light collectors are collecting notches in the light-collecting optical fibers.

10. The position sensor of claim 1, wherein at least some of the light collectors are roughened collecting surfaces on the light-collecting optical fibers.

11. The position sensor of claim 1, wherein each light-collecting optical fiber comprises
    a second end remote from the extraction end, wherein the second end of the light-collecting optical fiber is internally reflective.

12. The position sensor of claim 1, wherein the first light-collecting optical fiber and the second light-collecting optical fiber are substantially coaxial.

13. A position sensor comprising
    a light-source-and-light-emitting structure operable to emit light from each of an emitter plurality of light emitters disposed along an emitting length;
    a first light detector having a first-light-detector light output;
    a first light-collecting structure in a parallel but spaced-apart relation to the emitting length of the light-source-and-light-emitting structure and having
       a first-light-collecting-structure extraction end that provides a first light output to the first light detector, and
       a first plurality of first-light-collecting-structure light collectors disposed along a first-light-collecting-structure collecting length of the first-light-collecting-structure in a facing relation to a first group of the respective light emitters of the light-source-and light-emitting structure;
    a second light detector having a second-light-detector light output;
    a second light-collecting structure in a parallel but spaced-apart relation to the emitting length of the light-source-and-light-emitting structure and having
       a second-light-collecting-structure extraction end that provides a second light output to the second light detector, and a second plurality of second-light-collecting-structure light collectors disposed along a second-light-collecting-structure collecting length of the second-light-collecting structure in a facing relation to a second group of the respective light emitters of the light-emitting structure, wherein the first group and the second group of light emitters of the light-emitting structure are different; and an opaque light shield disposed between and movable relative to the light-source-and-light-emitting structure and the light-collecting structures, wherein a length of the opaque light shield measured parallel to the light-source-and-light-emitting structure is such that at least some of the first group and at least some of the second group of light collectors are not facing the light shield for at least some positions of the light shield.

14. The position sensor of claim 13, wherein at least one of the first light-collecting structure and the second light-collecting structure comprises an optical fiber.

15. The position sensor of claim 13, further including a sensor readout that receives the first-light-detector light output and the second-light-detector light output, and provides a responsive sensor output indicative of the position of the light shield.

16. The position sensor of claim 15, wherein the sensor output is responsive to a difference between the first-light-detector light output and the second-light-detector light output.

* * * * *